Inventor:
Roger L. Nowland
By his Attorney
Clarence D. Kerr

Patented June 17, 1941

2,246,061

UNITED STATES PATENT OFFICE 2,246,061

PROCESS AND APPARATUS FOR MAKING BEVERAGES

Roger L. Nowland, New York, N. Y.

Application April 9, 1938, Serial No. 201,025

13 Claims. (Cl. 53—3)

The invention relates to the making of liquid beverages, and particularly to the making of tea infusions.

The time-honoured methods of making tea infusions are best carried out by hand and, indeed, are not readily adaptable to performance in any simple form of automatic or semi-automatic apparatus. Being performed by hand, much necessarily depends upon the individual skill of the host or hostess, and results are uncertain.

It is quite generally accepted that to obtain a correctly-prepared tea infusion, certain rules must be observed with great fidelity. First, the water must be brought to a boil and be poured over the tea leaves into a heated pot, while the water is at the boiling temperature. Second, the tea leaves must be steeped in the water for a definite period and must be agitated or stirred while steeping. Third, the tea leaves must be removed from the liquid infusion. This sequence of steps cannot be performed with any simple form of apparatus in use today for making tea infusions or coffee decoctions. Percolators in use today, for example, offer no means for running clear boiling water through the basket continuously. Too, they provide no means for steeping, and thus fail as well to meet the second requirement noted above. The ordinary drip coffee maker provides no means for steeping or for agitating or stirring. The pressure-vacuum type of coffee makers in common use today provide no means for pouring boiling water, or for agitating or stirring.

The foregoing discussion indicates exemplarily the difficulties encountered in any attempt to devise any simple form of apparatus for the automatic or semi-automatic preparation of tea infusions in accordance with accepted principle of tea making. Conversely, it shows the difficulty of devising a method which will produce a beverage comparable with approved manual practices but which also can be performed in some simple form of apparatus permitting accurate control and giving uniformly satisfactory results. It is an object of my invention to provide an improved process and apparatus which will overcome these difficulties.

More particularly, it is an object of my invention to provide an improved method of making tea infusions which not only will produce a beverage of uniform degree of excellence, but which can be performed by means which are largely automatic in operation.

Another object is to provide apparatus for preparing tea infusions which will operate in a manner satisfying accepted requirements as to pouring, steeping and agitating, or the equivalent or superlative thereof.

Other objects and advantages will appear as the description proceeds.

I have found that excellent tea infusions are obtained when, after the water has been brought to a boil and poured over the tea leaves, the following steps are performed: applying a differential pressure to the liquid which has passed through the leaves to submerge the leaves in it, steeping the leaves in the liquid for a definite period and then withdrawing them from the liquid. More particularly, I have found that good results are uniformly obtained when during the steeping process the liquid is caused to flow through the leaves. An intermittent flow is particularly efficacious. When intermittent flow is produced by causing air to bubble through the liquid in the region of the tea leaves at intervals, an additional aerating effect is obtained. The details of the method will be treated of more fully and be better understood after consideration of the apparatus shown in the drawings.

In the drawings, Fig. 1 is a central vertical cross-sectional view of a preferred form of apparatus embodying the invention. Fig. 2 is a top plan view of the water-heating chamber shown in the lower part of Fig. 1.

Figure 5:
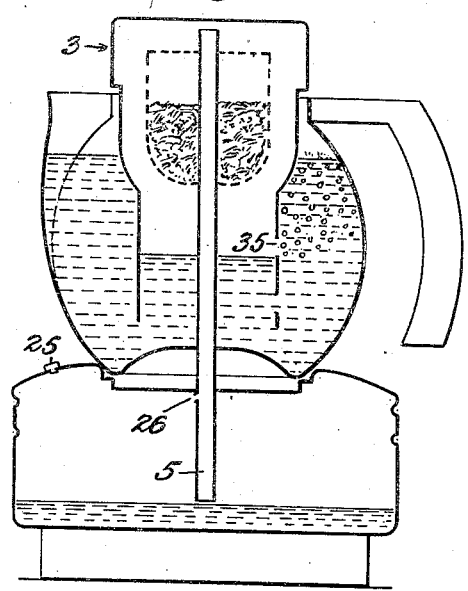
Figure 6:
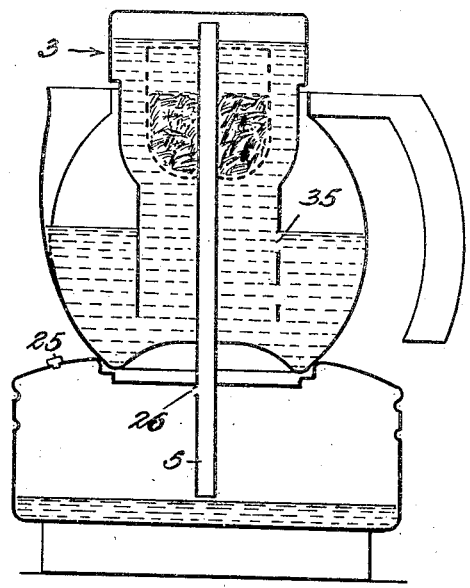
Figure 7:
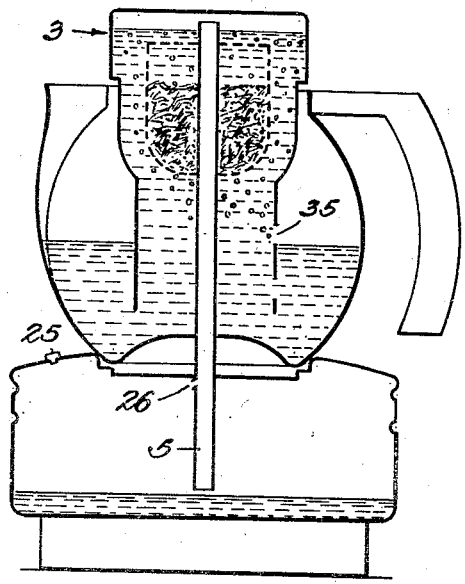

Figs. 5, 6, 7, and 8 are diagrammatic views of apparatus similar to that shown in the other views, illustrating the operation of the apparatus in accordance with my novel method. Fig. 5 indicates the conclusion of the pouring step; Fig. 6 and Fig. 7 alternate phases of the steeping and agitating step; and Fig. 8 the equilibrium condition when ready to pour.

The preferred form of apparatus selected for illustration consists generally of a teapot 1, kettle 2, steeping chamber 3, tea leaves container 4, and a fluid conduit 5 extending from the lower part of the kettle to the upper part of the steeping chamber. In this preferred form of apparatus the teapot, kettle, and communicating conduit are constructed and arranged to permit the pot to be lifted from the kettle when the tea is to be poured. It should be understood, however, that if desired, the pot and kettle can be constructed as a single unit.

In order to provide for ready separation of the teapot and kettle, the conduit 5 is constructed in sections. The tubular member 6 constituting the lower section thereof is associated with the kettle while the tubular member 7 which constitutes the upper section is formed as a part of the pot. I prefer that the tubular member 6 be formed as a part of, or be arranged to be supported by, the cover 8. The cover 8 is conveniently provided with a raised marginal flange 9 arranged for sealing engagement with a depressed marginal flange 10 surrounding the opening in the kettle. The tubular member 7 is secured in any convenient manner to the bottom 11 of the pot which may be arched upwardly in the center so as to permit the tubular member to project below it. In the construction shown, the tubular member 7 extends through an opening in the bottom 11, and is provided with a collar 12 bearing against the bottom. A nut 13 holds the member 7 in place. Suitable sealing means are provided to render this construction watertight.

The meeting ends of the tubular members 6 and 7 are constructed to provide a seal between them. I have found that such a seal is practically air- and watertight when properly constructed. I prefer that the meeting ends be formed to provide a ball and socket connection or that their surfaces be inclined, as shown, to provide a frusto-conical engagement therebetween comprising the complementary surfaces 14 and 15 on the members 6 and 7 respectively. An effective seal at this point is insured by so constructing the teapot and kettle that part of the weight of the pot is carried by the upper end of the tubular member 6. When the pot is perfectly balanced, a slight clearance is provided at 16 between the bottom periphery of the pot and the top of the kettle, or the cover, or both, as the case may be. Actually the pot will usually tilt over slightly to one side so that part of its weight will be carried by the tubular element 6 and part by the engagement of its bottom edge with the kettle. Thus the weight of the pot may be carried principally by the top surface 14 of the member 6 and some portion of the kettle, or kettle cover, toward the back of the pot where the handle 17 unbalances the weight slightly. It will be seen, however, that by reason of the ball and socket or frusto-conical engagement between the pot and the bowl of the kettle, an effective seal is maintained.

It will be seen that the sealing surface 15 of the upper tubular member 7 is of such an extent as to provide a guiding or self-centering action during the operation of replacing the pot on the kettle. If desired, additional centering means may be provided in the form of an inclined flange 18 secured to, or forming a part of, the cover 8 for cooperation with the lower edge of the tubular member 7. It will be understood that various modifications are possible in the sealing and centering means just described.

Figure 2:
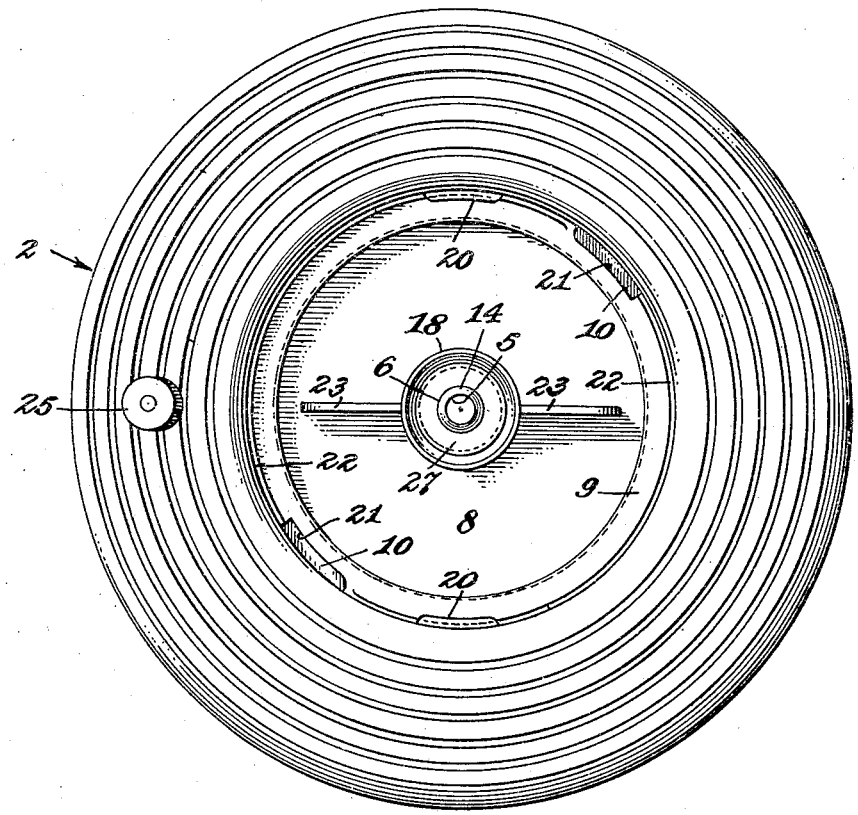

The cover 8 is provided with any suitable form of securing means for the purpose of attaining a fit which is substantially airtight and which makes it possible to maintain a satisfactory pressure differential between the inside and the outside of the kettle. For example, the cover might be made so as to have a press fit with the kettle. In the construction illustrated, I have employed a bayonet lock between the kettle and cover, the downwardly extending flange 19 of the kettle being provided with projections 20 (Fig. 2) and the cover 8 being notched at 21 so as to freely pass these projections during application and removal. After the cover has been brought below the projections 20 it is turned so as to bring the marginal flange 22 underneath the projections. The top surface of the flange 22 may be peripherally inclined so that as the cover is rotated the engagement of this inclined surface with the projections 20 serves to force the flange 9 of the cover tightly against the complementary flange 10 of the kettle. The cover may be provided with a pair of upstanding wings 23 to assist in turning it during application and removal.

The kettle is provided with a suitable time release vent 24 with a valve cap 25 for opening and closing it. The tubular member 6 is provided with a pressure control vent 26 providing communication between the kettle and the conduit 5. This vent should be located above the maximum normal level of the water in the kettle. I prefer that the cover 8 be provided with a raised portion 27 immediately surrounding the tubular member so that the vent will be disposed above the level of the water in the kettle even when it is filled up to the lower edge of the opening. The purpose and operation of the vents 24 and 26 will be described later.

The receptacle 4 which is to hold the tea leaves may conveniently be supported upon the tubular member 7 although it might be supported by the steeping unit 3 or in any other manner which might be desired. I have shown it mounted on the upper end of the member 7 for which purpose the latter is provided with a shoulder 28 and an extension 29 of frusto-conical form. The tea leaves receptacle comprises a perforated metal shell 30 or other foraminous body. In the preferred embodiment it is provided with a center tube 31 constituting an extension of the tubular member 7 and forming a part of the conduit 5. The tube 31 is secured to, or forms a part of, the shell 30. As shown, it is joined to the bottom of the shell by a frusto-conical portion cooperating with the extension 29 of the tubular element 7. The tea basket thus formed may also be provided with a depending flange 32 for engagement with the tubular element 7 to further support the basket. The basket may be provided with a perforated cover 33 fitting around the upper end of the tube 31. It may be provided with a tubular flange 34 for engagement with the tube.

The steeping unit 3 is preferably formed of glass and comprises a member which is closed at the top and sides but which is preferably open at the bottom. It is provided with an aperture or a series of apertures 35 in the lower part of its side walls. Suitable securing means such as provided by the spring fingers 36 secured to the teapot are provided to steady the steeping unit and to hold the parts in place when the pot is removed and tilted during pouring of the tea. The side walls of the steeping unit 3 may be provided with a circumferential groove 37 to receive the rounded ends of the fingers 36 so that the unit is yieldably locked in position. I have found it beneficial to have the side walls of the unit curved or tapered inwardly as at 38. The advantage of this construction will appear when the operation of the apparatus is described.

Figure 1:
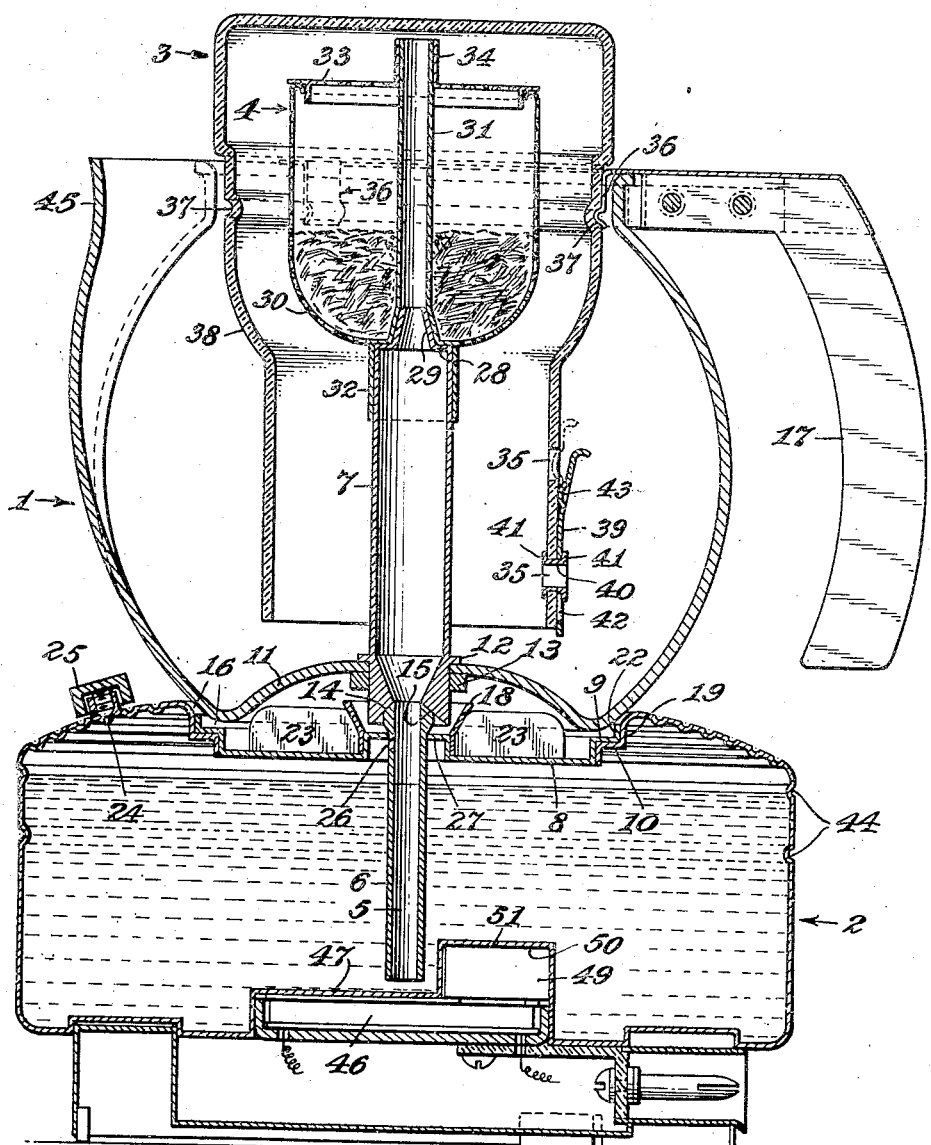
Figure 4:
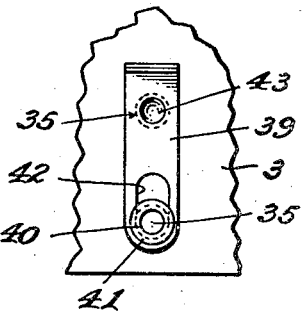
Fig. 4 is a fragmentary elevational view of a vent control applied to the steeping unit.

With particular reference to Figs. 1 and 4, I have illustrated one arrangement for varying the effective height of the steeping control vent provided by the apertures 35. The upper of the two apertures is arranged to be opened and closed by means of a slidable or oscillatable gate 39. This gate may conveniently be secured to the lower aperture 35 by means of an eyelet 40 passing therethrough. This eyelet may be spun or pressed into the form shown in the drawings to provide flanges 41 and thus permanently secure the gate 39 to the wall. The aperture in the gate through which the eyelet 40 extends may be in the form of a slot 42 so that the gate 39 will be slidable as well as oscillatable with respect to the lower aperture. At its upper end the gate 39 may have a projection 43 arranged to extend into the upper aperture when it is in position to close the latter. To open the upper aperture it is merely necessary to lift the upper end of the gate 39 and slide it downwardly or to one side. The resiliency of the gate cooperates with the projection 43 to hold the gate in both its open and closed positions. Other forms of adjusting means may be used for providing a steeping control vent of adjustable effective height and of course the adjustment is not necessarily limited to two positions. For example, a slidable gate employed in connection with a slot in the side walls of the steeping unit might be substituted for the arrangement shown, the parts being so constructed that the height of the vent will be determined by the height of the lower edge of the slidable gate, this edge and the edges of the slot acting as an inverted weir. The purpose in having a vent of adjustable height will be understood when the operation of the apparatus is described. It has to do with an adjustment adapting the apparatus for use in making varying quantities of tea. The kettle 2 may be provided with suitable measuring indications showing the level to which it should be filled in order to make the desired quantity of tea. Thus, in the embodiment illustrated, the kettle has circumferential beads 44 readily visible through the top when the kettle is opened for filling. The lower beads may represent, for example, the quantity of water required for preparing four cups of tea and the upper bead the quantity for preparing six cups. The height of the vent 35 in the steeping unit is such as to insure proper operation when preparing one or the other of these selected quantities. The upper vent will be closed when the kettle is filled to the lower bead 44 but will be opened when it is filled to the upper bead. There is no need to close the lower vent at any time because the operation will always be controlled by the position of the highest open vent. If three or more vents are provided, it will be necessary to provide means for closing all of the vents except the lowermost one. It will be understood that the spout 45 provides a passage through which the interior of the pot is always open to the atmosphere.

Figure 3:
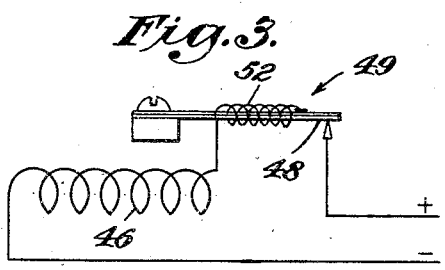
Fig. 3 is a diagrammatic view of the electrical circuit for one form of automatic control means for the heating unit of the device shown in Fig. 1.

The apparatus which has so far been described forms a complete operating assembly adapted to be placed upon a suitable heater or stove to bring the water in the kettle to a boil. The apparatus may be provided, however, with a self-contained heating unit, and I have shown such a unit consisting of a suitable electric resistance heater 46 which may be contained in the recess provided by a raised portion 47 in the bottom of the kettle. It will be understood that various other forms of heating devices might be employed. The control of the heating unit may be manual. I consider it advantageous, however, to provide an automatic control so arranged that the heating unit will be disconnected as soon as the level of the water in the kettle reaches the lower end of the conduit 5. For this purpose I provide a thermostatic control or other control responsive to temperature changes and capable of adjustment in accordance therewith. A particular feature of the arrangement disclosed resides in placing the thermal control unit above the bottom of the kettle. Thus I have shown a bi-metallic element 48 of a thermostat 49 (Fig. 3) located in a recess 50 formed by an extension 51 in the bottom wall of the kettle (Fig. 1). With particular reference to the wiring diagram shown in Fig. 3, I have indicated such a thermostatic element arranged adjacent to or surrounded by a booster coil 52 which may be connected in series with the resistance heater 46. Adjustment is effected so that the element 48 maintains electrical contact keeping the circuit closed at all temperatures up to and including the boiling temperature, but breaking the circuit whenever the temperature rises appreciably higher than that. When so adjusted, the heating unit remains in operation so long as there is any substantial quantity of water surrounding the extension 51 in the bottom of the kettle because the water takes all of the available heat below the boiling temperature. When, however, the level of the water drops down to the lower end of the conduit 5, the extension 51 is no longer adequately cooled by the boiling water and the temperature in the region of the bi-metallic element is raised above the boiling temperature due to the proximity of the booster coil 52, and the circuit is broken.

I shall now describe the practice of my method and operation of the apparatus with particular reference to Fig. 1 and Figs. 5, 6, 7, and 8 of the drawings. The process consists in bringing water to a boil, pouring the water over tea leaves, applying a differential pressure to the liquid which has passed through the leaves to submerge the leaves in it, steeping the leaves in the liquid for a definite period and withdrawing the leaves from the liquid. A particular feature of the method as practiced in the apparatus disclosed resides in the agitation of the leaves during part of the steeping step or in causing a flow of the liquid through the leaves during steeping. This special action withdraws the aromatic values more uniformly from the entire body of tea leaves and appears to produce a better infusion and one which is subject to more uniform control. Another particular feature of the process consists in causing air to flow through the liquid in the region of the submerged leaves during steeping. This is of value not only in producing flow of the liquid through or over the leaves but also appears to be of value in aerating the liquid. I believe that one of the reasons for the high quality of the infusion produced in accordance with my method resides in increasing somewhat the oxygen content of the tea. I do not wish to be limited in any respect, however, as to this precise explanation of the value of causing air to flow through the liquid. In any event, the flow of air in the manner which is to be described definitely produces a flow of the liquid through or around the leaves which in itself is beneficial. The flow of the liquid around the leaves is promoted by the inclined or curved walls 38 of the steeping unit. The intermittent nature of the liquid flow to be described is also considered to be highly advantageous.

In Fig. 1 the kettle is represented as filled with water up to the upper bead 44 and the upper aperture 35 in the steeping unit is open so that the apparatus is ready for use in preparing—say—six cups of tea. Tea leaves are placed in the basket 30 and the valve cap 25 is turned so as to close the timing release vent 24. The kettle is now heated to bring the water to a boil. Were it not for the provision of the vent 26 in the conduit 5, water would pass up through the conduit and be poured over the tea before reaching the boiling point. This vent, however, is of sufficient size to permit equalization of the pressure within and without the kettle until the boiling temperature is reached. Also, below the boiling temperature the vent 26 permits warm air and vapor from the kettle to circulate within the steeping chamber and pot before the water begins to discharge from the kettle. This heats the pot before any of the infusion reaches it, which is advantageous in producing good tea. When the boiling temperature is reached, the pressure will be sufficient to overcome the equalizing effect of the vent 26. When this point is reached the boiling water passes up through the conduit 5 and is discharged at its upper end to pour over the tea leaves in the basket. It is not necessary that all of this boiling water pass over or through the tea leaves, and the quantity of water actually passing through the leaves may be varied by altering the shape of the top wall of the steeping unit 3. The liquid which has passed through the leaves together with whatever amount of water runs down the sides of the steeping unit without coming in contact with the leaves begins to fill up the bottom of the reservoir provided by the teapot. As this level reaches the upper edge of the upper vent 35, pressure begins to build up in the steeping chamber causing the liquid to rise around the outside of the steeping unit and above the level of the liquid on the inside. When this pressure becomes sufficiently higher than atmospheric pressure to force the level inside the chamber below the upper edge of the vent 35 the expanding air within the chamber will flow out of the vent, producing a stream of bubbles as indicated in Fig. 5. At about this time the heating unit will be disconnected, this action being automatic in the embodiment illustrated, the water level in the kettle having dropped below the thermostat. Thereafter the pressure within the kettle and steeping chamber will begin to drop and this will continue until the pressure within the chamber is below atmospheric pressure. Thus there is produced a differential pressure causing the liquid which has passed through or over the tea leaves to rise within the steeping chamber, submerging the leaves in it for steeping. This condition is illustrated diagrammatically in Fig. 6.

An alternate phase of the steeping operation is illustrated in Fig. 7. As the pressure differential increases to such an extent as to bring the level of the liquid in the pot (i. e., surrounding the steeping unit) below the upper edge of the vent 35, the pressure is partially equalized by the inflow of air through the vent, producing a stream of air bubbles flowing upwardly inside of the steeping chamber as shown in the diagram which is Fig. 7. This in turn allows the level of the liquid within the steeping chamber to drop sufficiently to cover the vent 35 on the outside as the liquid rises in the pot in corresponding volumetric relationship. This condition brings us back to that already described with reference to Fig. 6. The alternation of the phases represented in Fig. 6 and Fig. 7 continues automatically and accomplishes two things (1) a flow of air through the liquid with relation to the submerged leaves is produced intermittently, and (2) the liquid in which the leaves are submerged alternately rises and falls in the region of the basket, causing a flow of liquid through or over the leaves, and circulating the liquid throughout the teapot.

Figure 8:
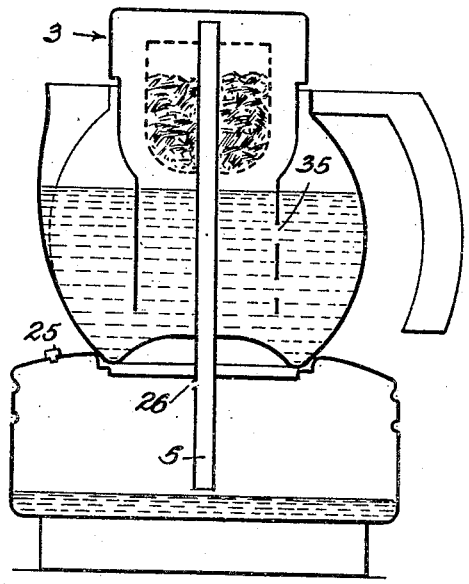

After the leaves have been steeped in this manner for a definite period, the valve cap 25 is adjusted to open the timing release vent. This permits an inflow of air through the vent to equalize the pressure within and without the steeping chamber. The vent 26 plays a part in thus equalizing the pressure although I have found in practice that the level of the water remaining in the kettle will generally be a slight distance below the end of the conduit 5 so that air entering the vent 24 can also flow up through the end of the conduit into the chamber whereupon the liquid in the chamber and pot seeks a common level as indicated in Fig. 8, withdrawing the leaves from the liquid. The tea infusioin is now prepared and ready to serve.

If desired, there may be provided automatic means for controlling the time length of the steeping operation. For this purpose some form of water clock may be employed. It will be seen that by my invention I have provided a process and apparatus for making tea infusions which is susceptible to effective control, and which can be performed by means which are largely automatic in operation. The tea infusions produced are comparable in quality with infusions produced manually by those particularly well skilled in tea making, and in some respects are believed to be superior to infusions made in accordance with the best practice heretofore known. It is insured that the water will not be poured over the tea leaves until it has reached the boiling temperature. The tea leaves are steeped in the liquid which has passed over or through them, and during the steeping period the liquid is caused to flow through or over the leaves, which accomplishes the purpose of agitation or stirring while offering better control of the operation. Finally the tea leaves are removed from the liquid infusion. The apparatus itself is relatively simple in construction and operation, and it is also very compact.

While I have described my invention with particular reference to the making of tea infusions, it may be useful in preparing other liquid beverages such as coffee, cocoa, or food or medicinal drinks made from aromatic animal or vegetable matter or mineral preparations, or mixture of these. The term "beverage matter" is used herein to include all of the materials named above.

The possibility of making the teapot and kettle as a combined unit has been suggested above. Numerous other changes might be made in the construction of the apparatus disclosed by way of illustration. For example, the container for the tea leaves might be made of cloth instead of metal, and it is not necessary that the conduit extend up through the center of the tea bag so long as it be arranged to pour the boiling water over the tea leaves. Various other possible modifications will be apparent to those skilled in the art of preparing tea.

The terms and expressions which I have employed are used as terms of description and not of limitation, and I have no intention, in the use of such terms and expressions, of excluding any equivalents of the features shown and described, or portions thereof, but recognize that various modifications are possible within the scope of the invention claimed.

I claim:

1. Apparatus for making liquid beverages comprising means for bringing water to a boil, a receptacle for beverage matter, means for pouring the water over the matter in the receptacle, means for applying automatically a differential pressure to the liquid which has passed over the matter to submerge the matter in it while permitting the liquid to remain at a temperature below boiling, means for causing intermittent flow of the liquid through the beverage matter while the beverage matter is submerged in the liquid, and means for disabling the differential pressure applying means to withdraw the matter from the liquid.

2. Apparatus for making tea comprising means for bringing water to a boil, a receptacle for tea leaves, means for pouring the water over the tea leaves in the receptacle, means for applying a differential pressure to the liquid which has passed over the tea leaves to submerge the leaves in it, means for intermittently varying the pressure applied by the differential pressure means to cause a flow of the liquid through the leaves while the leaves are substantially entirely submerged therein, and means for disabling the differential pressure applying means to withdraw the leaves from the liquid.

3. Apparatus for making tea comprising a closed water-heating chamber, a receptacle for tea leaves, a tea infusion reservoir, means including a fluid conduit for causing boiling water to flow from the chamber and pour over the tea leaves in the receptacle, means for applying a differential pressure to the liquid which has passed over the tea leaves to submerge the tea leaves in it, the last-named means comprising a baffle extending into the reservoir and arranged to provide a water seal between the reservoir and a portion of the fluid conduit, and a vent in the baffle to permit intermittent equalization of pressure on the liquid as its level changes under the influence of the differential pressure applying means.

4. Apparatus for making tea comprising a closed water-heating chamber, a receptacle for tea leaves, a tea infusion reservoir, means including a fluid conduit for causing boiling water to flow from the chamber and pour over the tea leaves in the receptacle, means for applying a differential pressure to the liquid which has passed over the tea leaves to submerge the tea leaves in it, the last-named means comprising a baffle extending into the reservoir and arranged to provide a water seal between the reservoir and a portion of the fluid conduit, while permitting intermittent equalization of pressure on the liquid as its level changes under the influence of the differential pressure applying means.

5. Apparatus for making tea comprising a closed water-heating chamber, a receptacle for tea leaves, a tea infusion reservoir, means including a fluid conduit for causing boiling water to flow from the chamber and pour over the tea leaves in the receptacle, means for applying a differential pressure to the liquid which has passed over the tea leaves to submerge the tea leaves in it, the last-named means comprising a baffle extending into the reservoir and arranged to provide a water seal between the reservoir and a portion of the fluid conduit, an adjustable vent in the baffle, and means for disabling the differential pressure applying means.

6. Apparatus for making tea comprising a closed water-heating chamber, a receptacle for tea leaves, a tea infusion reservoir, means including a fluid conduit for causing boiling water to flow from the chamber and pour over the tea leaves in the receptacle, means for applying a differential pressure to the liquid which has passed over the tea leaves to submerge the tea leaves in it, the last-named means comprising a baffle extending into the reservoir and arranged to provide a water seal between the reservoir and a portion of the fluid conduit, a vent in the baffle to permit intermittent equalization of pressure on the liquid, and a vent in the chamber to permit complete equalization of pressure on the liquid.

7. In apparatus for making tea, a tea infusion reservoir, a receptacle for tea leaves supported in an elevated position with respect to the bottom of the reservoir, means for applying automatically a differential pressure to the surface of liquid contained in the reservoir to submerge the tea leaves in the liquid, means for alternately decreasing and increasing the differential in pressure while permitting the liquid to remain at a temperature below boiling to cause the liquid to flow through the leaves with each change in pressure while the leaves are submerged, and means for disabling the differential pressure applying means to withdraw the leaves from the liquid.

8. Apparatus for making tea comprising a closed water heating chamber, a tubular conduit extending into the chamber with an opening above the bottom of the chamber, a tea infusion reservoir, a steeping chamber with closed sides and top but open bottom disposed within the reservoir, and a receptacle for tea leaves disposed within the steeping chamber and above its open bottom, the tubular element arranged with its upper end in a position to direct water over the top of the receptacle.

9. Apparatus for making tea comprising a closed water heating chamber, a tubular conduit extending into the chamber with an opening above the bottom of the chamber, a tea infusion reservoir, a steeping chamber with closed sides and top but open bottom disposed within the reservoir, a receptacle for tea leaves disposed within the steeping chamber and above its open bottom, the tubular element arranged with its upper end in a position to direct water over the top of the receptacle, and a vent in the tubular element providing communication between the heating chamber and the steeping chamber.

10. Apparatus for making tea comprising a closed water heating chamber, tubular conduit extending into the chamber with an opening above the bottom of the chamber, a tea infusion reservoir, a steeping chamber with closed sides and top but open bottom disposed within the reservoir, a receptacle for tea leaves disposed within the steeping chamber and above its open bottom, the tubular element arranged with its upper end in a position to direct water over the top of the receptacle, and a vent in the tubular element providing communication between the heating chamber and the steeping chamber, the vent being located near the top of the heating chamber to provide such communication when the heating chamber is charged with water.

11. The process of making tea which comprises the steps of bringing water to a boil, pouring the water over tea leaves, submerging the leaves in the liquid which has passed through the leaves, steeping the leaves therein for a definite period, causing the liquid to pass intermittently up and down through the leaves during the steeping period and while the leaves are submerged in the liquid, and withdrawing the leaves from the liquid.

12. In apparatus for making liquid beverages, a closed water-heating vessel, a beverage vessel, a tubular member extending from said water-heating vessel to the lower portion of said beverage vessel for supplying heated water thereto, and a second tubular member connected to and extending into said beverage vessel, said tubular members being constructed and arranged to provide a ball and socket type engagement therebetween so that said first tubular member carries part of the weight of one of said vessels, said last-named vessel also being arranged to be supported at a point removed from the ball and socket engagement upon slight tilting of said vessel while maintaining a liquid-tight gravity seal at the juncture of the tubular members.

13. Apparatus for making liquid beverages comprising a closed water-heating chamber, a receptacle for solid beverage matter, and a reservoir for the liquid beverage, said reservoir being separate from the chamber, means for pouring water over the matter in the receptacle and collecting the liquid in the reservoir, means for applying automatically a differential pressure to the liquid in the reservoir to submerge the matter in it, means for causing intermittent flow of the liquid through the beverage matter while the beverage matter is submerged in the liquid, and means for disabling the differential pressure applying means to withdraw the matter from the liquid.

ROGER L. NOWLAND.